US011838065B2

(12) United States Patent
Yu et al.

(10) Patent No.: US 11,838,065 B2
(45) Date of Patent: *Dec. 5, 2023

(54) METHOD AND APPARATUS FOR ANTENNA CALIBRATION IN A WIRELESS COMMUNICATION SYSTEM

(71) Applicant: Telefonaktiebolaget LM Ericsson (publ), Stockholm (SE)

(72) Inventors: Shaowei Yu, Beijing (CN); Lei Xiao, Beijing (CN); Huaisong Zhu, Beijing (CN); Xueqin Chen, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/873,238

(22) Filed: Jul. 26, 2022

(65) Prior Publication Data

US 2022/0368433 A1 Nov. 17, 2022

Related U.S. Application Data

(63) Continuation of application No. 16/614,864, filed as application No. PCT/CN2017/088970 on Jun. 19, 2017, now Pat. No. 11,438,079.

(51) Int. Cl.
*H04B 17/12* (2015.01)
*H04B 7/06* (2006.01)
(Continued)

(52) U.S. Cl.
CPC ........... *H04B 17/12* (2015.01); *H04B 7/0617* (2013.01); *H04B 17/14* (2015.01); *H04W 88/085* (2013.01)

(58) Field of Classification Search
CPC ........ H04B 17/11; H04B 17/12; H04B 17/14; H04B 17/0617; H04W 88/085
See application file for complete search history.

(56) References Cited

U.S. PATENT DOCUMENTS 5,654,982 A * 8/1997 Goodson ................ H04L 27/38
375/364
9,705,611 B1 7/2017 West
(Continued)

FOREIGN PATENT DOCUMENTS

CN 101569110 A 10/2009
CN 102158265 A 8/2011
(Continued)

OTHER PUBLICATIONS

Chinese Office Action, Chinese Application No. 201780091941.2, dated Jan. 12, 2023, 5 pages.
(Continued)

*Primary Examiner* — Nizar N Sivji
(74) *Attorney, Agent, or Firm* — Sage Patent Group (57) ABSTRACT

A method is implemented in a digital unit connected with a plurality of distributed antennas including a first antenna, a second antenna and a third antenna. The method comprises: causing transmitting a first signal from the first antenna, a second signal from the second antenna, and a third signal from the third antenna in a same frequency resource; obtaining a receiver and transmitter side loop-back phase difference between the first antenna and the second antenna based on the first signal received at the third antenna, the second signal received at the third antenna, the third signal received at the first antenna, and the third signal received at the second antenna; and obtaining estimations of a time delay difference and an initial phase difference between the first and second antennas based on the obtained loop-back phase difference.

20 Claims, 7 Drawing Sheets

(51) Int. Cl.
*H04B 17/14* (2015.01)
*H04W 88/08* (2009.01)
*H04B 17/11* (2015.01)

(56) References Cited

U.S. PATENT DOCUMENTS

| | | | |
|---|---|---|---|
| 9,866,336 B2 * | 1/2018 | Geis | H03K 5/1532 |
| 2009/0256601 A1 * | 10/2009 | Zhang | H03L 7/085 |
| | | | 341/111 |
| 2015/0304131 A1 * | 10/2015 | Seyama | H04L 25/0202 |
| | | | 375/343 |
| 2017/0202018 A1 | 7/2017 | Cha et al. | |
| 2017/0367062 A1 * | 12/2017 | Patel | H04L 27/2607 |
| 2019/0149384 A1 * | 5/2019 | Kim | H04L 27/26025 |
| | | | 370/328 |

FOREIGN PATENT DOCUMENTS

| | | |
|---|---|---|
| CN | 102405555 A | 4/2012 |
| WO | 2013056398 A1 | 4/2013 |
| WO | 2015085510 A1 | 6/2015 |
| WO | 2016141566 A1 | 9/2016 |
| WO | 2017001013 A1 | 1/2017 |
| WO | WO-2017001013 A1 * | 1/2017 ............ H01Q 1/243 |

OTHER PUBLICATIONS

International Search Report and Written Opinion of the International Searching Authority, PCT/CN2017/088970, dated Mar. 16, 2018, 8 pages.
Ericsson, 3GPP TSG-RAN WG1 #49, "Absence of Array Calibration—Impact on Precoding Performance," R1-072463, Kobe, Japan, May 7-11, 4 pages.
Fujitsu, 3GPP TSG RAN WG1 Meeting #86bis, "Over the air calibration for channel recoprocity in NR MIMO," R1-1608809, Libson, Portugal, Oct. 10-14, 2016, 7 Pages.
European Search Report for European Patent Application No. 17914829.1, dated May 18, 2020.

* cited by examiner

METHOD AND APPARATUS FOR ANTENNA CALIBRATION IN A WIRELESS COMMUNICATION SYSTEM

CROSS REFERENCE TO RELATED APPLICATION

This application is a continuation of U.S. patent application Ser. No. 16/614,864 filed on Nov. 19, 2019, which is a 35 U.S.C. § 371 national stage application of PCT International Application No. PCT/CN2017/088970, filed on Jun. 19, 2017, the disclosures and contents of which are incorporated herein by reference in their entireties.

TECHNICAL FIELD

The non-limiting and example embodiments of the present disclosure generally relate to a technical field of wireless communication, and specifically to methods, apparatuses and computer program products for antenna calibration in a distributed antenna system (DAS).

BACKGROUND

This section introduces aspects that may facilitate better understanding of the disclosure. Accordingly, the statements of this section are to be read in this light and are not to be understood as admissions about what is in the prior art or what is not in the prior art.

In wireless communication systems, there is a requirement for high spectrum efficiency (SE) and seamless coverage. Multiple input multiple output (MIMO) techniques have been known as an effective way for improving SE and coverage in wireless communication systems. For example, MIMO has been adopted as a key feature in Long Term Evolution (LTE)/LTE-Advanced (LTE-A) system developed by the third generation project partnership (3GPP). To further enhance coverage and throughput for some hot-spot and/or indoor massive user access scenarios, such as university, Central Business District (CBD), subway station, stadium, air-port, railway station waiting-room and so on, a distributed MIMO (D-MIMO) feature has been proposed.

In a D-MIMO scenario, antennas may be located at different sites. For instance, a DAS may add remote radio units (RRUs) with multiple antennas to enhance coverage and capacity of a cellular system. DAS works by connecting the RRUs to a processing unit of a base station via a high bandwidth and low latency link such as a Common Public Radio Interface (CPRI). The cellular system can make use of the RRUs in DAS to provide more uniform coverage, reduced outage, and higher throughputs, especially in shadowed and indoor locations. As an example, in LTE, D-MIMO can be applied in downlink to mitigate co-channel interference or increase spatial multiplexing gain effectively, and consequently cell capacity, average throughput and cell-edge user throughput can be improved.

In a DAS system where multiple RRUs are distributed at different sites, joint pre-coding or beam-forming can be done to keep co-phase combining at the receiver side. In addition, DAS may be combined with single user (SU) or paired multi-user (MU) MIMO communication by treating the RRUs as a distributed antenna array and/or equipping RRUs with multiple antennas. A preferred operating mode in MIMO systems may change depending on interference conditions. In SU DAS, antenna selection (AS) is preferred over beamforming (BF) in terms of ergodic rate when out-of-cell interference is incorporated into the communication model. In MU MIMO DAS, in one configuration, BF to a plurality of users is preferred over BF to only the best user.

In order to minimize phase (and amplitude) difference among multiple transceiver chains so as to guarantee precise BF/pre-coding and obtain large diversity or multiplexing gain, antenna calibration is required.

SUMMARY

Antenna calibration for a distributed antenna system is a challenge for D-MIMO implementation. Methods, apparatuses and computer program products have been provided in the present disclosure for facilitating antenna calibration with low complexity. It will be appreciated that though some embodiments of the present disclosure are described with reference to a LTE, LTE-A or 5G system, embodiments are not limited thereto, but could be more widely applied to any wireless communication system where similar problems exist.

Various embodiments of the present disclosure mainly aim at providing methods, apparatuses and computer program products for antenna calibration for distributed antennas. Other features and advantages of embodiments of the present disclosure will be understood from the following description of various embodiments when read in conjunction with the accompanying drawings, which illustrate, by way of example, the principles of embodiments of the present disclosure.

In a first aspect of the disclosure, there is provided a method in a digital unit. The digital unit is connected, directly or indirectly, with a plurality of distributed antennas including (but not limited to) a first antenna, a second antenna and a third antenna. The method comprises: causing transmitting a first signal from the first antenna, a second signal from the second antenna, and a third signal from the third antenna in a same frequency resource; obtaining a receiver and transmitter side loop-back phase difference between the first antenna and the second antenna based on the first signal received at the third antenna, the second signal received at the third antenna, the third signal received at the first antenna, and the third signal received at the second antenna; and obtaining estimations of a time delay difference and an initial phase difference between the first and second antennas based on the obtained receiver and transmitter side loop-back phase difference.

In an embodiment, the digital unit may cause transmitting the first, second and third signals in a time period during which no data is transmitted. In a further embodiment, the time period may include at least one of: a Guard Period (GP) in a time divisional duplexing (TDD) frame structure, and a subframe during which no data and control signaling is transmitted.

In another embodiment, the digital unit may cause transmitting the first, second and third signals in a time divisional multiplexing (TDM) manner.

In an embodiment, the first, second and third signals transmitted from the first, second, and third antennas may be generated based on a same constant amplitude sequence.

In another embodiment, the digital unit may obtain the receiver and transmitter side loop-back phase difference between the first and second antennas by: obtaining a first loop-back phase for the first antenna by comparing a phase for the third signal received at the first antenna and a phase for the first signal received at the third antenna; obtaining a second loop-back phase for the second antenna by comparing a phase for the third signal received at the second antenna and a phase for the second signal received at the third antenna; and obtaining the receiver and transmitter side loop-back phase difference by determining a difference between the first and second loop-back phases.

In some embodiments, the digital unit may obtain the estimations of the time delay difference and the initial phase difference between the first and second antennas by: estimating the time delay difference and the initial phase difference according to polynomial fit based on a Least Square (LS) criterion or a Recursive Least Square criterion.

In an embodiment, the digital unit may obtain the receiver and transmitter side loop-back phase difference between the first and second antennas by: obtaining the receiver and transmitter side loop-back phase difference between the first and second antennas for a subcarrier in the frequency resource.

In another embodiment, the method may further comprise obtaining a loop-back amplitude difference between the first and second antennas based on the first signal received at the third antenna, the second signal received at the third antenna, the third signal received at the first antenna and the third signal received at the second antenna. In a further embodiment, the digital unit may obtain the loop-back amplitude difference between the first antenna and the second antenna by: obtaining the loop-back amplitude difference between the first and second antennas for a subcarrier in the frequency resource.

In some embodiments, at least two of the first, second and third antennas may locate at different remote radio units (RRUs) connected with the digital unit.

In still another embodiment, the method may further comprise: adjusting a phase or timing of a signal to be transmitted from the first or second antenna based on the estimation of the time delay difference or initial phase difference.

In a second aspect of the disclosure, there is provided an apparatus connected, directly or indirectly, with a plurality of distributed antennas including (at least) a first antenna, a second antenna and a third antenna. The apparatus comprises: a transmission controlling unit configured to cause transmitting a first signal from the first antenna, a second signal from the second antenna, and a third signal from the third antenna in a same frequency resource; a obtaining unit configured to obtain a receiver and transmitter side loop-back phase difference between the first antenna and the second antenna based on the first signal received at the third antenna, the second signal received at the third antenna, the third signal received at the first antenna, and the third signal received at the second antenna; and an estimating unit configured to obtain estimations of a time delay difference and an initial phase difference between the first and second antennas based on the obtained receiver and transmitter side loop-back phase difference.

In a third aspect of the disclosure, there is provided an apparatus connected, directly or indirectly, with a plurality of distributed antennas including (at least) a first antenna, a second antenna and a third antenna. The apparatus comprises a processor and a memory, the memory containing instructions executable by the processor whereby the apparatus is operative to: cause transmitting a first signal from the first antenna, a second signal from the second antenna, and a third signal from the third antenna in a same frequency resource; obtain a receiver and transmitter side loop-back phase difference between the first antenna and the second antenna based on the first signal received at the third antenna, the second signal received at the third antenna, the third signal received at the first antenna, and the third signal received at the second antenna; and obtain estimations of a time delay difference and an initial phase difference between the first and second antennas based on the obtained receiver and transmitter side loop-back phase difference.

In a fourth aspect of the disclosure, there is provided a computer program product, comprising instructions which, when executed on one or more processors, cause the one or more processors to carry out a method according to the first aspect of the present disclosure.

In a fifth aspect of the disclosure, there is provided an apparatus in a digital unit connected, directly or indirectly, with a plurality of distributed antennas including (at least) a first antenna, a second antenna and a third antenna. The apparatus comprises processing means adapted to perform a method according the first aspect of the present disclosure.

In a sixth aspect of the disclosure, there is provided a computer readable storage medium having a computer program product embodied thereon. The computer program product includes instructions which, when executed on at least one processor, cause the at least one processor to carry out a method according the first aspect of the present disclosure.

In a seventh aspect of the disclosure, there is provided a digital unit comprising the apparatus according to the second or third aspect of the disclosure.

In an eighth aspect of the disclosure, there is provided a network device comprising the apparatus according to the second or third aspect of the disclosure.

According to various aspects and embodiments as mentioned above, antenna calibration with low complexity are enabled for distributed antenna systems without requiring presence of a couple control unit (CCU).

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. Furthermore, the communications between network devices in the wireless communication network may be performed according to any suitable generation communication protocol, including, but not limited to, Global System for Mobile Communications (GSM), Universal Mobile Telecommunications System (UMTS), Long Term Evolution (LTE), and/or other suitable communication protocols, such as the first generation (1G), the second generation (2G), 2.5G, 2.75G, the third generation (3G), the fourth generation (4G), 4.5G, the fifth generation (5G) communication protocols, wireless local area network (WLAN) standards, such as the IEEE 802.11 standards; and/or any other appropriate wireless communication standard, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a DL transmission refers to a transmission from the network device to a terminal device, and an UL transmission refers to a transmission in an opposite direction.

Figure 1:
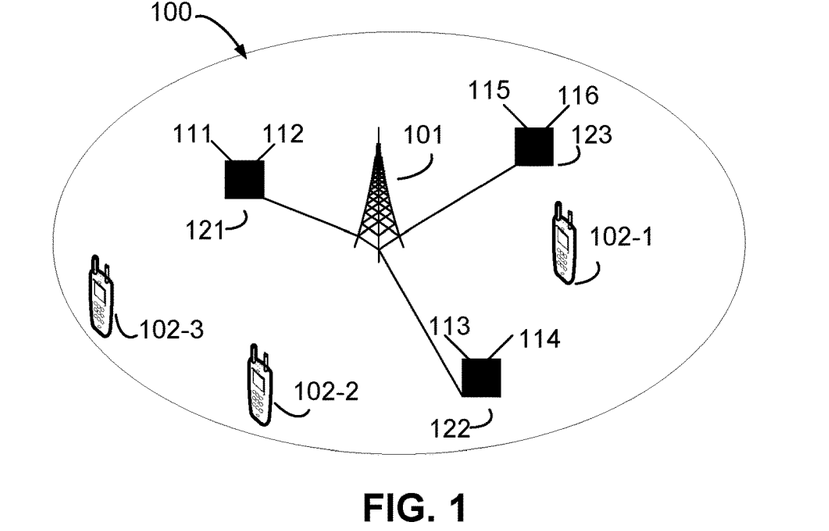
FIG. 1 illustrates an example wireless communication network in which embodiments of the present disclosure may be implemented.

FIG. 1 illustrates an example wireless communication network 100 in which embodiments of the present disclosure may be implemented. As shown in FIG. 1, the wireless communication network 100 may include one or more network devices (also referred to as network nodes), for example, a network device 101, which may be in a form of an eNB or gNB. It will be appreciated that the network device 101 can also be in a form of base station (BS), a Node B (NB), a virtual BS, Base Transceiver Station (BTS), and/or Base Station Subsystem (BSS), AP and the like. The network device 101 may be equipped with a plurality of distributed antennas (e.g., antennas 111-116) locating at different sites, for example locating at a plurality of RRUs 121-123. Using one or more of the distributed antennas, the network device 101 provides radio connectivity to a set of terminal devices or UEs 102-1, 102-2, . . . , 102-N, which are collectively referred to as "terminal device(s) 102", within its coverage, where N is a natural number. For example, DL data from the network device 101 may be transmitted by joint beam-forming or pre-coding among the plurality of RRUs 121-123 to enable in-phase combining at the terminal device 102 side. In other words, service data may be jointly transmitted to a target terminal device(s) from several sites, and joint beam-forming or pre-coding among a plurality of antennas may be performed to enable in-phase combining at the receiver side. The network device 101 may also comprise or be equipped (or associated) with a digital unit (DU) not shown in FIG. 1 which is responsible for data and control signal processing.

Using a beam-forming or pre-coding technique, a network device is able to adaptively optimize the radiation beam pattern of the DAS to achieve high gain and controlled beam-width in desired directions by weighting antenna arrays in terms of spatial channel correlation. In this way, signal to interference plus noise ratio (SINR) or signal to noise ratio (SNR) for a desired user is maximized while interference to undesired users is minimized Consequently, inter-cell and intra-cell co-channel interference is suppressed, and cell edge throughput and system capacity is improved.

Beam-forming weights are generated based on characteristic of a compound spatial channel which is a combination of a spatial wireless channel and an antenna apparatus internal chain. In TDD wireless communication systems like TD-SCDMA, TD-LTE, and TD LTE-A, the spatial wireless channel has good reciprocity in uplink and downlink. It means that it is possible for the network side to obtain channel status of a downlink wireless channel by detecting an uplink wireless channel. But the reciprocity does not exist in internal chains of an antenna apparatus. An internal chain of an antenna apparatus usually consists of intermedate frequency (IF) chain(s), radio frequency (RF) circuit and possibly of a feeder cable connection between RRU and antennas, which may be different for different antennas, and may cause different amplitude degradation and phase shifts. Besides, the amplitude attenuation and phase shift property may vary with temperature, atmospheric humidity and device aging. Therefore, antennas calibration is required to compensate the difference in amplitude and phase shifts among different antenna chains in order to keep channel reciprocity in uplink and downlink. It should be appreciated that even in a FDD system, antenna calibration is also required to facilitate accurate BF weighting/precoding.

Figure 2A:
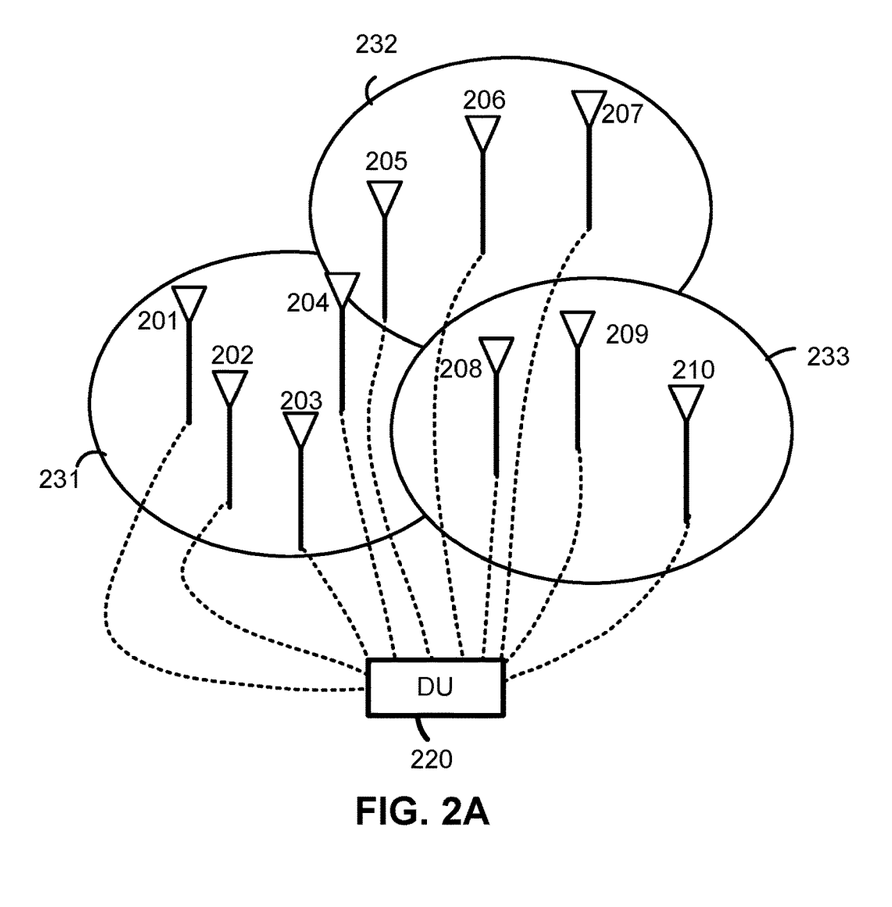
FIGS. 2A-2B show communication scenarios with DAS according to embodiments of the present disclosure.

FIG. 2A shows a communication scenario with DAS, in which a plurality of distributed antennas 201-210 are connected, directly or indirectly, to a digital unit (DU) 220 which may be a part of a base station or shared by a plurality of base stations. The plurality of antennas 201-210 may be used for data channel multiplexing and/or control channel combination. For example, antennas 201-204 may cover an area 231, antennas 205-207 may cover an area 232 and antennas 208-210 may cover an area 233. The areas 231-233 may be served by one or more base stations.

Figure 2B:
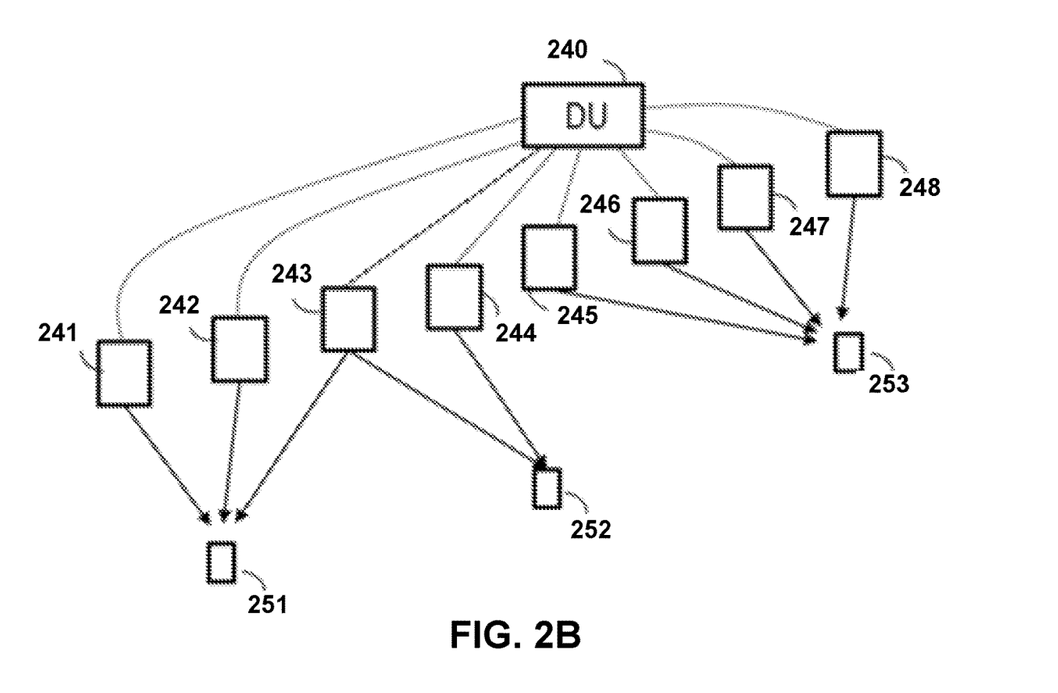

FIG. 2B shows another communication scenario with DAS, in which several distributed transmitting points (TPs) 241-248 are connected, directly or indirectly, to a DU 240. The plurality of TPs 241-248 may belong to one or more base stations (not shown). In this example scenario, TPs 241-243 serve UE 251, TPs 243-244 serve UE 252, and TP 245-248 serve UE 253, respectively.

In both example scenarios shown in FIGS. 2A-2B, it may be infeasible to apply centralized antenna array calibration with a couple network (e.g., a Couple Control Unit (CCU)), since transmitters (e.g. antenna elements) are located at the different sites.

In addition, it has been realized by inventors of the present disclosure that UL and DL channel reciprocity cannot be guaranteed by performing only centralized antennas array calibration at each antenna site (i.e., intra-transceiver antenna calibration) separately, since the internal chains of an antenna apparatus at distributed sites may be different.

Therefore, a new method and apparatus for antenna calibration in DAS without a couple network is needed in order to minimize the amplitude and phase difference among distributed antennas.

Figure 3:
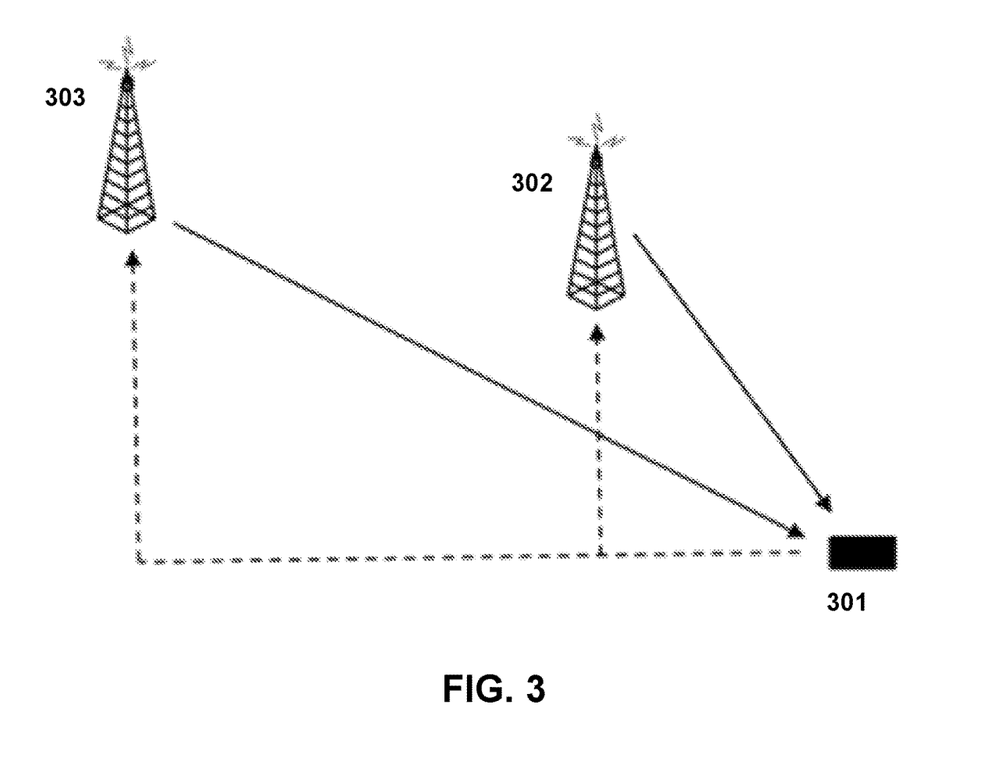
FIG. 3 illustrates an antenna calibration solution based on an assistant node.

One way for distributed antennas calibration is to introduce an assistant node, such as a relay or UE, and such a method is schematically illustrated in FIG. 3. In this solution, the introduced assistant node 301 works as a reference for the distributed antennas calibration. In particular, all distributed antennas (e.g., 302 and 303) to be calibrated receive a calibration reference signal transmitted by the assistant node 301 and calibrate their uplink antenna apparatus chains by referring to the calibration reference signal. The assistant node 301 receives antenna calibration reference signals from the distributed antennas 302 and 303 (which may be transmitted in time division multiplexing (TDM), code division multiplexing (CDM) or a hybrid multiplexing manner) and calibrates their downlink antenna apparatus chains by referring to the received signal. In such methods, the third-party assistant node 301 has to be introduced as a reference, and varying wireless channels among the assistant node 301 and target distributed antennas 302 and 303 may bring much uncertainty. Furthermore, since transceiver chain of the assistant node 301 is involved in the transceiver calibration chains, calibration result may be inaccurate, and the method and apparatus for antenna calibration become complex.

Figure 4:
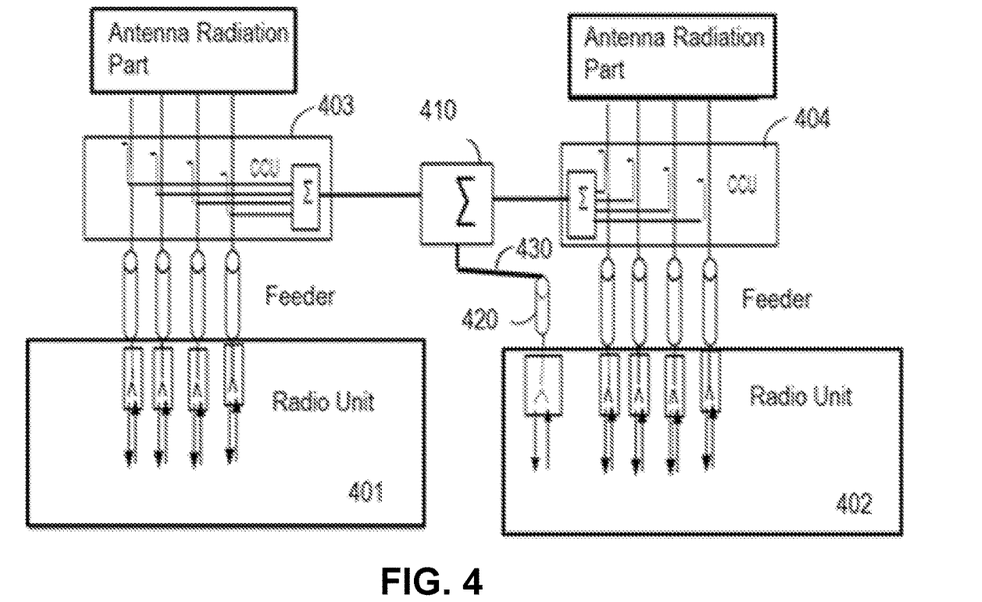
FIG. 4 illustrates an antenna calibration solution based on CCU for co-site antenna arrays.

An alternative method for distributed antennas calibration is illustrated in FIG. 4. As shown in FIG. 4, calibration ports of a cluster of RRUs 401 and 402 are connected by a combiner 410, and a calibration port 420 of the RRUs is used as a reference antenna port. By using a cable 430 instead of a direct wireless channel to feedback signals to the calibration port 420, and by joint detection of uplink and downlink calibration signal, loop-back difference of uplink and downlink difference among working radio paths are sounded and compensated. This solution does not require a third-party assistant node, and therefore calibration accuracy is improved and complexity is decreased significantly. However, in a D-MIMO system, a cluster of RRUs associated with a same DU (also referred to as a D-MIMO cluster) may be distributed at different sites, and each RRU in the D-MIMO cluster may connect two-path or singe-path antennas without a CCU (403 and 404 shown in FIG. 4) by cable, and in such a scenario, the solution shown in FIG. 4 can hardly be utilized since it requires that the cluster of RRUs 401 and 402 be installed co-site. Furthermore, the external combiner 410 involved in the solution may not be cost optimal.

Furthermore, inventors of the present disclosure have realized that a tiny delay difference among antenna systems may cause a large phase shift for a high frequency sub-carrier in OFDM systems. A field test has shown that an error in a beam-forming pattern is often restricted to be less than 5 degrees by telecommunication operators. In other words, the delay difference among antenna elements must be less than $\frac{1}{32}$ Ts (sampling duration) for a 20 MHz TD-LTE system. None of the distributed antennas calibration solutions currently available can meet such strict requirements on calibration accuracy with reasonable complexity.

In embodiments of the present disclosure, methods and apparatuses for antenna calibration in DAS without a couple network (e.g., a CCU) have been proposed. With embodiments of the present disclosure, calibration accuracy and system robustness for DAS may be improved with low complexity. Embodiments of the present disclosure may be applied in a D-MIMO system based on multi-points joint pre-coding technology.

In a D-MIMO scenario, distributed antennas are located at the different sites but a line of sight (LOS) path among them is always available. For simplicity, a calibration apparatus for three groups of antennas is illustrated schematically in FIG. 5, where one DU 501 connects with three groups of RRUs 502-504 over, e.g. optical fiber 510-530 respectively, and antenna radiation elements 541-546 are connected with a corresponding RRU (502, 503 or 504) by cable, for example. Antenna calibration for any of the antennas 541-546 may be controlled by the DU 501. In some embodiments, both the DU 501 and antennas 541-546 can be considered as a part of a network device 500 which may be a base station (which may be a virtual concept). It should be appreciated that in some other embodiments, the network device 500 may include more or less RRUs or antennas or antenna arrays. Furthermore, in some scenarios, the DU 501 may be shared by a plurality of network devices, and may be connected, directly or indirectly, with antennas (or RRUs) associated with more than one network device.

Figure 6A:
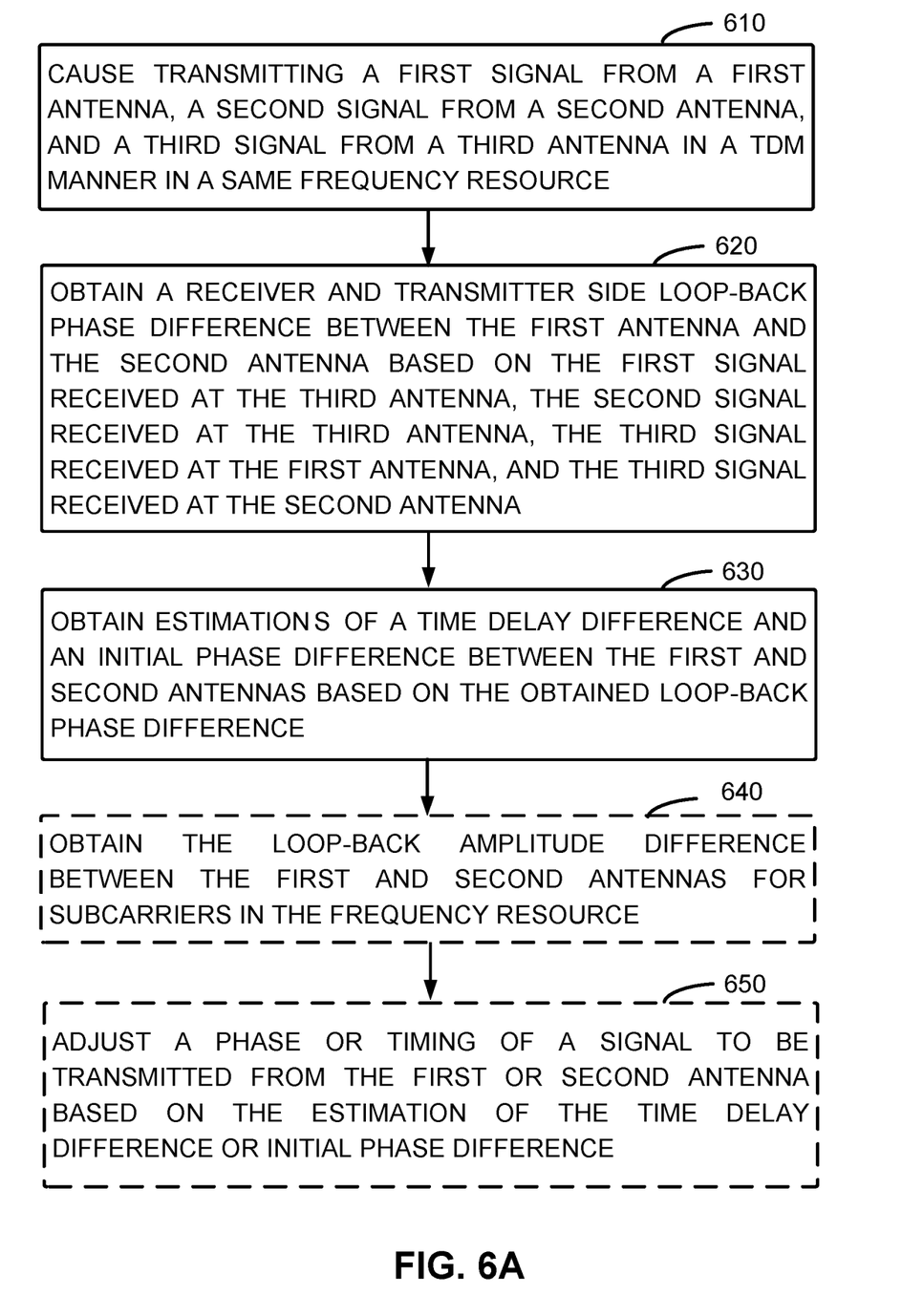
FIGS. 6A-6B illustrate flow charts of antenna calibration methods according to embodiments of the present disclosure.

FIG. 6 shows a flowchart of a method 600 in a digital unit according to an embodiment of the present disclosure. In an embodiment, distributed antenna calibration is divided into an initial calibration phase and a periodical calibration phase, and the method 600 may be used for the initial calibration phase and/or the periodical calibration phase.

The digital unit (DU) performing the method 600 is connected, directly or indirectly, with a plurality of distributed antennas including, for example, a first antenna, a second antenna and a third antenna. For instance, the DU may be a DU associated with the network device 101 shown in FIG. 1, or the DU 501 shown in FIG. 5. For ease of discussion, the method 600 will be described below with reference to the DU 501 and the scenario illustrated in FIG. 5. However, embodiments of the present disclosure are not limited thereto and may be applied more widely in other scenarios where similar problem exists.

As illustrated in FIG. 6, at block 610, the DU 501 causes transmissions of a first signal from the first antenna, a second signal from the second antenna, and a third signal from the third antenna in a same frequency resource. Each of the first, second and third signal may be referred to as a calibration signal.

Figure 5:
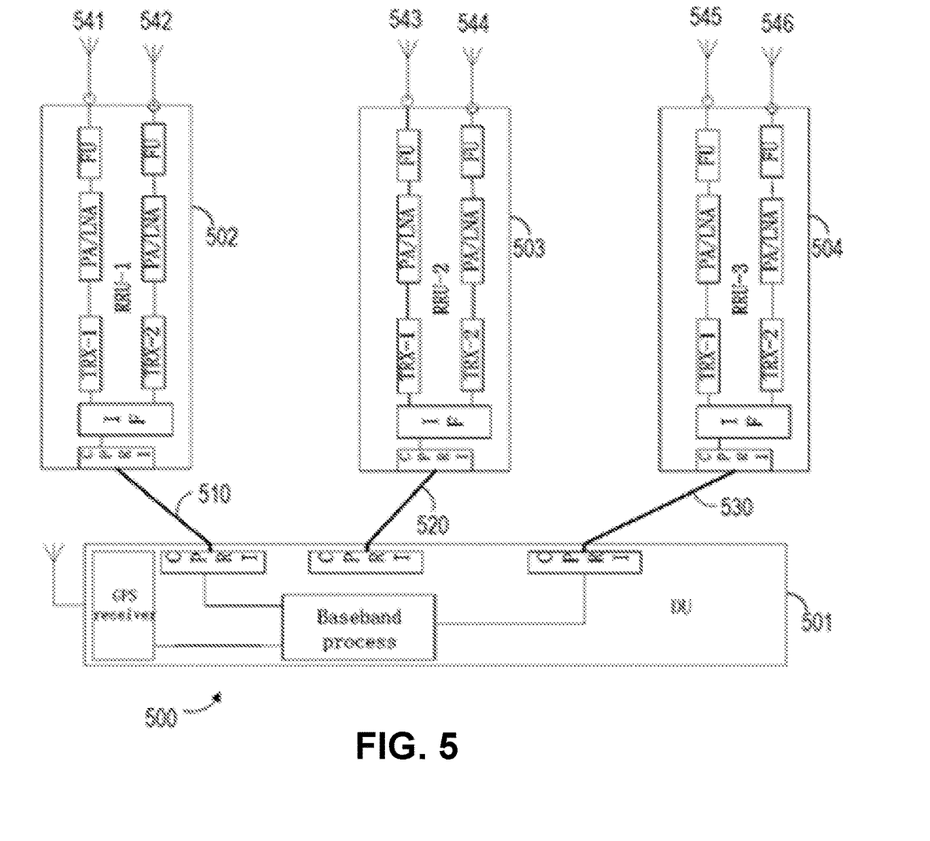
FIG. 5 illustrates a schematic block diagram of a calibration apparatus according to an embodiment of the present disclosure.

In an embodiment, prior to the operations of block 610, the DU 501 is synchronized to a Global Position System (GPS) or other absolute network clocks and RRUs 502-504 recover timing from, for example, a CPRI which interconnects with the DU 501, when systems boot. The timing of CPRI may be from the GPS.

In some embodiments, operations of block 610 may be triggered when RRUs 502-504 are switched to a calibration status and receive an initial calibration command after preheating of the RRUs 502-504 and DU 501.

Alternatively or in addition, operations of block 610 may be triggered when RRUs 502-504 are switched to a periodical calibration status and receive a periodical calibration command after initial calibration is done.

Embodiments are not limited to any specific time and/or frequency resources for transmitting the first, second, and third signals at block 610. Just for illustration rather than limitation, in an embodiment, the first, second, and third signals may be transmitted in an empty time slice, that is, in a time slice during which no data or control signal is transmitted. The empty time slice can be, for example, a Guard Period (GP) defined in a 3GPP TDD frame structure (such as LTE TDD frame structure) or an un-used sub-frame. Transmission in an empty time slice may improve signal detection performance. In another embodiment, the first, second and third signal may be multiplexed with data traffic in a normal subframe.

As an example rather than limitation, in another embodiment, the first, second, and third signals may be transmitted in a TDM manner, which helps reduce interference to each other. It should be appreciated that in a further embodiment, other multiplexing scheme such as CDM may be used instead. In the latter case where CDM is used, orthogonal codes are preferably used for multiplexing the first, second and third signals.

The first, second, and third signals may be any predefined signal, and embodiments of the present disclosure are not limited to any specific way for constructing these calibration signals. For example, the calibration signal may be constructed offline based on a constant amplitude sequence. In a LTE system, the calibration signal may be constructed based on a root Zadoff-Chu (ZC) sequence as follows.

Assume that the u-th root ZC sequence defined by $$x_u(n) = e^{-j\frac{\pi u n(n+1)}{N_\omega}},$$

$$0 \le n \le N_{zc} - 1$$

is used, $N_{zc}$ is length of the sequence. A Discrete Fourier Transformation (DFT) operation may be applied to obtain a corresponding frequency domain ZC sequence $x_u'(k)$=DFT $(x_u(n))$, k=0, . . . , $N_{zc}$−1. By mapping $x_u'(k)$ to one Orthogonal Frequency Division Multiplexing (OFDM) symbol, it is obtained $x_c(k)$=[0, $x_u'(1)$, . . . , $x_u'(N_1)$, $0_1$, . . . $0_{N_2}$, $x_u'(N_1+1)$, . . . , $x_u'(N_{ZC})$], where $N_1=N_{ZC}/2$, and $N_2=2048-N_{ZF}$ if 2048 points DFT/FFT is to be applied. After adding a pre-Cyclic Prefix (CP) and a post-CP, the transmitted signal $s_c(n)$ in time domain is $s_c(n)=[S_{OFDM}(N_{FFT}-N_{CP}+1, \ldots, N_{FFT}) S_{OFDM}(1, \ldots, N_{FFT}) S_{OFDM}(1, \ldots, N_{CP})]$ where $S_{OFDM}(n)$=DFT $(x_c(k))$, or $S_{OFDM}(n)$=FFT($x_c$(k)).

In an embodiment, the CP length is $N_{cp}$=128, a length of the ZC sequence is $N_{zc}$=839, and length of DFT/FFT for $x_c(k)$ is $N_{FFT}$=2048, however, it should be appreciated that embodiments of the present disclosure are not limited to any specific setting for the calibration signal generation. In a Time Division-Synchronization Code Division Multiple Access (TD-SCDMA) system, similar calibration signals may be constructed.

For ease of discussion, it is assumed that the first antenna, the second antenna, and the third antenna for transmitting the first, second and third signals at block 610 are antennas 541, 542 and 543 shown in FIG. 5, respectively. Though in this example, the first and second antennas belong to a same RRU (i.e., RRU 502 shown in FIG. 5), embodiments are not limited thereto. Further, in some embodiments, each of the first antenna, the second antenna and the third antenna may be from a separate antenna array.

In an embodiment, at block 610, a calibration signal s1 (e.g., s1=$s_c(n)$) is a sequence transmitted from the third antenna 543, then at the first and second antennas, the received signal at subcarrier k may be expressed as:

$$C_{1,k}e^{j\Theta 1,k} = H_{tx,3,k}*H_{rx,1,k}*G_{3,1,k}*s_k+n = c_{tx,3,k}* \\ e^{j\Theta tx,3,k}*_{rx,1}*e^{j\Theta rx,1,k}*G_{3,1,k}*s_k+n \quad (1),$$

$$C_{2,k}e^{j\Theta 2,k} = H_{tx,3,k}*H_{rx,2,k}*G_{3,2,k}*s_k+n = c_{tx,3,k}* \\ e^{j\Theta tx,3,k}*c_{rx,2,k}*e^{j\Theta rx,2,k}*G_{3,2,k}*s_k+n \quad (2)$$

Here, $H_{tx,n,k}$ and $H_{rx,m,k}$ denote frequency domain response of the n-th serving transmitting path and the m-th serving receiving path at the k-th subcarrier, respectively. For example, $H_{tx,3,k}$ denotes frequency domain response of the third antenna transmitting path at the k-th subcarrier. $G_{m,n,k}$ denotes frequency domain channel response of the wireless connection between antenna m and antenna n for the k-th subcarrier; $s_k$ denotes the calibration signal transmitted in the k-th subcarrier; $n_k$ denotes white noise at the k-th subcarrier. $C_{m,k}$ denotes amplitude of the signal received at the m-th antenna and the k-th subcarrier, and $\theta_{m,k}$ denotes phase of the signal received at the m-th antenna and the k-th subcarrier. For convenience, the subscript k may be omitted.

Likewise, at block 610, the calibration signal $s_k$ is transmitted from the first antenna 541 at subcarrier k, and the signal received by the antenna 543 may be expressed as:

$$C_{3,k}e^{j\Theta 3,k} = H_{tx,1,k}*H_{rx,3,k}*G_{1,3,k}*s_k+n = c_{tx,1,k}* \\ e^{j\Theta tx,1,k}*c_{rx,3,k}*e^{j\Theta rx,3,k}*G_{1,3,k}*s_k+n \quad (3)$$

Further, at block 610, the calibration signal $s_k$ is also transmitted by the second antenna 542 at subcarrier k, and at the antenna 543, the received signal may be expressed as:

$$C_{1,k}e^{j\Theta 4,k} = H_{tx,2,k}*H_{rx,3,k}*G_{2,3,k}*s_k+n = c_{tx,2,k}* \\ e^{j\Theta tx,2,k}*c_{rx,3,k}*e^{j\Theta rx,3,k}*G_{2,3,k}*s_k+n \quad (4).$$

Based on the first signal received at the third antenna 543 ($C_{3,k}e^{j\Theta 3,k}$), the second signal received at the third antenna 543 ($C_{4,k}e^{j\Theta 4,k}$), the third signal received at the first antenna 541 ($C_{1,k}e^{j\Theta 1,k}$), and the third signal received at the second antenna 542 ($C_{2,k}e^{j\Theta 2,k}$), at block 620, the DU 501 obtains a receiver and transmitter side loop-back phase difference $\phi_{1,2}$ between the first antenna 541 and the second antenna 542.

Here, "loop-back" refers to a combination of uplink and downlink (or, a transmitting link and a receiving link) for a specified path, and "receiver and transmitter side loop-back phase" (also referred to as loop-back phase) is a phase difference between a signal transmitted from a specified antenna and a signal received at the same specified antenna.

At block 620, the DU 501 may obtain the receiver and transmitter side loop-back phase difference $\phi_{1,2}$ between the first and second antennas 541 and 542 via any suitable computation, and embodiments are not limited to any specific algorithm for obtaining the difference. Just for illustration purpose, an example implementation 620' of the block 620 is provided in FIG. 6B. In this example, the DU 501 obtains a first loop-back phase for the first antenna 541 at block 621 by comparing a phase for the third signal received at the first antenna (i.e., the signal $C_{1,k}e^{j\Theta 1,k}$), and a phase for the first signal received at the third antenna (i.e., the signal $C_{3,k}e^{j\Theta 3,k}$).

Figure 6B:
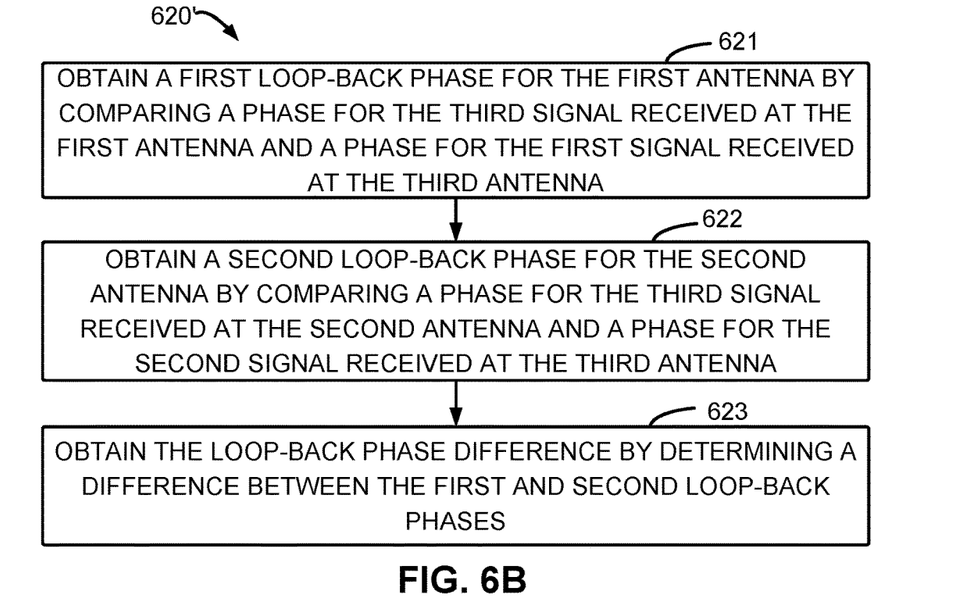

It is assumed that the wireless air-interface channel from antenna m to antenna n is same as the channel from antenna n to antenna m, or in other words, $G_{m,n}=G_{n,m}$, then at block 621 the first loop-back phase for the first antenna 541 at subcarrier k may be obtained to be: $\phi_{1,k}=\theta_{tx,1,k}-\theta_{rx,1,k}=\theta_{1,k}-\theta_{3,k}$.

Likewise, at block 622, the DU 501 obtains a second loop-back phase for the second antenna 542 by comparing a phase for the third signal received at the second antenna (i.e., the signal $C_{2,k}e^{j\Theta 2,k}$), and a phase for the second signal received at the third antenna (i.e., the signal $C_{4,k}e^{j\Theta 4,k}$), i.e., $\phi_{2,k}=\theta_{tx,2,k}-\theta_{rx,2,k}=\theta_{2,k}-\theta_{4,k}$.

At block 623, the DU 501 obtains the receiver and transmitter side loop-back phase difference between the first antenna 541 and the second antenna 542 by determining a difference between the first and second loop-back phases $\phi_{1,k}$ and $\phi_{2,k}$. That is, the DU 501 obtains:

$$\phi_{1,2,k}=\phi_{1,k}-\phi_{2,k}=(\theta_{1,k}-\theta_{3,k})-(\theta_{2,k}-\theta_{4,k}) \quad (5)$$

In an embodiment, the DU 501 may obtain a loop-back phase difference between the first antenna 541 and the second antenna 542 for each subcarrier k used for transmitting the calibration signal, for example by using the example implementation 620'. In another embodiment, the DU 501 may obtain a loop-back phase difference between the first antenna 541 and the second antenna 542 for only a subset of the subcarriers used for transmitting the calibration signal.

Now referring back to FIG. 6A. At block 630, the DU 501 obtains estimations of a time delay difference and an initial phase difference between the first and second antennas 541 and 542 based on the obtained loop-back phase difference $\phi_{1,2}$.

Assuming that the time delay between the first and second antennas 541 and 542 is $\Delta_t$ and the initial phase difference is $\phi_{ini}$, the loop-back phase difference $\phi_{1,2,k}$ for subcarrier k, can be written as:

$$\varphi_{1,2,k} = \frac{2\pi}{N} \times k \times \Delta t / T_s + \varphi_{ini} + n_k. \quad (6)$$

Therefore, at block 630, the DU 501 may obtain estimations for $\Delta_t$ and $\phi_{ini}$ based on equation (6) and the $\phi_{1,2,k}$ obtained at block 620 or 620'.

Embodiments are not limited to any specific algorithm for obtaining the estimation for $\Delta_t$ and $\phi_{ini}$ based on $\phi_{1,2,k}$. As an example, estimations for $\Delta_t$ and $\phi_{ini}$ may be obtained by Least Square (LS) polynomial fit on loop-back phase difference $\phi_{1,2,k}$ for sub-carrier k. That is, at block 630, the DU 501 may obtain $\Delta t_{est}$ and $\phi_{ini\_est}$ as follows:

$$\Delta t_{est} = \frac{L \cdot \sum_{k \in K}(k \cdot \varphi_{1,2,k}) - \sum_{k \in K} \varphi_{1,2,k} \cdot \sum_{k \in K} k}{L \cdot \sum_{k \in K} k^2 - \left(\sum_{k \in K} k\right)^2} * \frac{N}{2\pi} \quad (7)$$

$$\varphi_{ini\_est} = \frac{\sum_{k \in K}(k \cdot \varphi_{1,2,k}) \cdot \sum_{k \in K} k - \sum_{k \in K} \varphi_{1,2,k} \cdot \sum_{k \in K} k^2}{\left(\sum_{k \in K} k\right)^2 - L \cdot \sum_{k \in K} k^2}. \quad (8)$$

$\Delta t_{est}$ and $\phi_{ini\_est}$ denote the estimations for $\Delta_t$ and $\phi_{ini}$, respectively. K is a set (or subset) of sub-carriers for transmitting the calibration signal, and L is size of the set of K.

In another embodiment, at block 630, a polynomial fit based on a Recursive Least Square criterion may be utilized instead for obtaining the estimations.

In some embodiments, besides the loop-back phase difference, the DU 501 may further obtain a loop-back amplitude difference between the first and second antennas 541 and 542, for example, based on the first signal received at the third antenna, the second signal received at the third antenna, the third signal received at the first antenna and the third signal received at the second antenna, as shown in block 640 of FIG. 6A. In particular, in an embodiment, the DU 501 may obtain the loop-back amplitude difference between the first and second antennas for some or all subcarriers in the frequency resource used for transmitting the calibration signal. As an example, the loop-back amplitude difference at subcarrier k between the first and second antennas 541 and 542 may be expressed by equation (9):

$$A_{1,2,k}=(c_{rx,2,k}/c_{tx,2,k})/(c_{rx,1,k}/c_{tx,1,k})=(c_{1,k}/c_{4,k})\cdot(c_{3,k}/c_{2,k}) \quad (9).$$

Though antenna calibrations are described with reference to the first antenna 541 and the second antenna 542, it should be appreciated that similar method can be applied for calibrating any other antennas. For example, calibration for antennas 544 and 545 may be performed in parallel with the calibration for antennas 541 and 542, by using the same method 600. In this case, there may be signals transmitted simultaneously from the antenna 545 (or 544) and the antenna 541 (or 542), and the simultaneously transmission may be separated in frequency domain or in code domain by using orthogonal code sequences. In another embodiment, calibration for different antennas may be performed in series.

The obtained estimations for $\Delta_t$ and $\phi_{ini}$ (and $A_{1,2,k}$) enable adjustment of signals to be transmitted to compensate the phase (and amplitude) difference between antennas, such that calibration can be achieved. The adjustment of the signals to be transmitted based on the estimation of the time delay difference or initial phase difference may be performed in any suitable manner, for example, with any method currently available, and embodiments of the present disclosure are not limited to any specific way for the adjustment.

Optionally, as shown in FIG. 6A, at block 650, the DU 501 may adjust a phase or timing of a signal to be transmitted from the first or second antenna (541 or 542) based on the estimation of the time delay difference or initial phase difference.

In an embodiment, at block 650, the DU 501 may choose one phase (and/or time delay) difference as baseline or reference, and compensate the phase (and/or time delay) difference of the other antennas according to the baseline/reference.

The method 600 enables antenna calibration for DAS without introducing any third-party absolute reference or an assistant node, and does not need information exchange with other network devices. Furthermore, a CCU for calibration can be avoided, which results in complexity and cost reduction.

In the method 600, the calibration signal is transmitted over air-interface and the loop-back difference of uplink and downlink phase/delay among working paths are sounded and compensated jointly, which improves distributed antennas system calibration accuracy and system robustness and at the same time decreases the calculation complexity.

Figure 7:
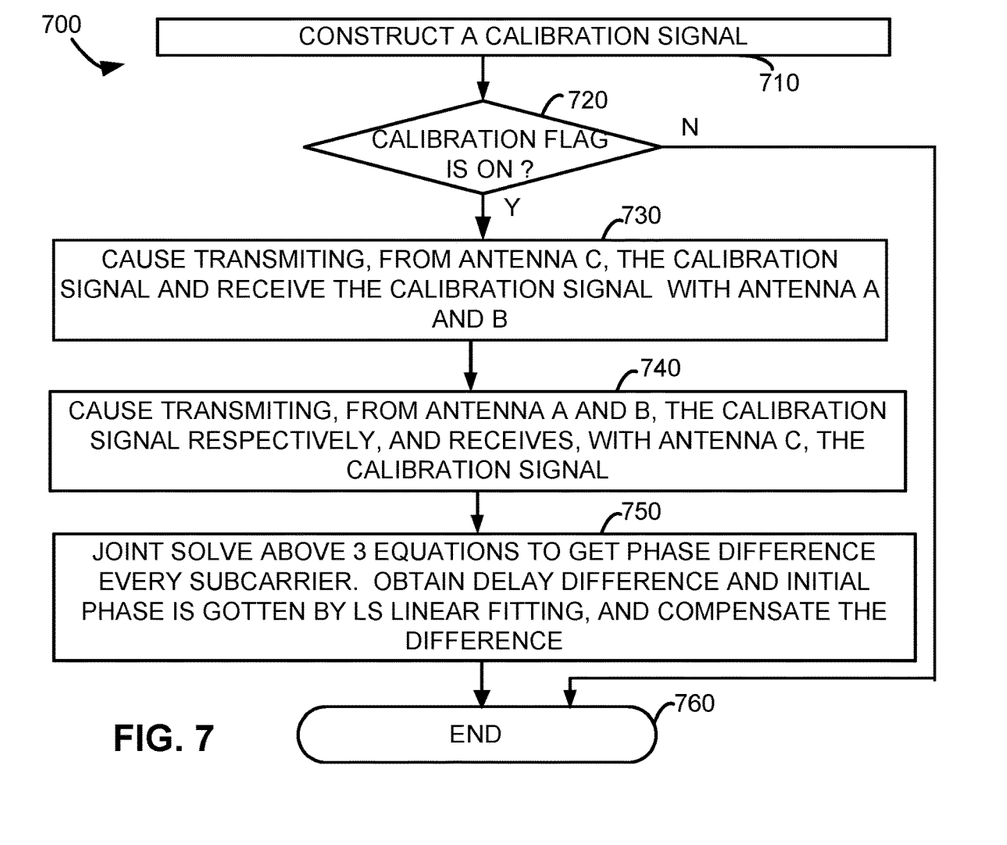
FIG. 7 illustrates a flow chart of another antenna calibration method according to an embodiment of the present disclosure.

FIG. 7 shows a flowchart of another method 700 in a digital unit according to an embodiment of the present disclosure. The DU is connected, directly or indirectly, with a plurality of distributed antennas including (but not limited to) antennas A, B and C. For instance, the DU may be the DU 501 shown in FIG. 5. For ease of discussion, the method 700 will be described below with reference to the DU 501 and the scenario illustrated in FIG. 5. However, embodiments of the present disclosure are not limited thereto and may be applied more widely in other scenarios where similar problem exists.

As illustrated in FIG. 7, at block 710, the DU 501 constructs a calibration signal, for example, the signal $s_c(n)$ described with reference to method 600. At block 720, the DU 501 determines whether a calibration flag is on. If the calibration flag is on, it means that calibration is triggered or activated, and the DU 501 performs antenna calibration for antennas A and B at blocks 730-750; otherwise, calibration is deactivated, and the process ends at block 760. As shown in FIG. 7, at block 730, the DU 501 causes transmitting the calibration signal from antenna C, and the calibration signal is received by antenna A and B.

Figure 8:
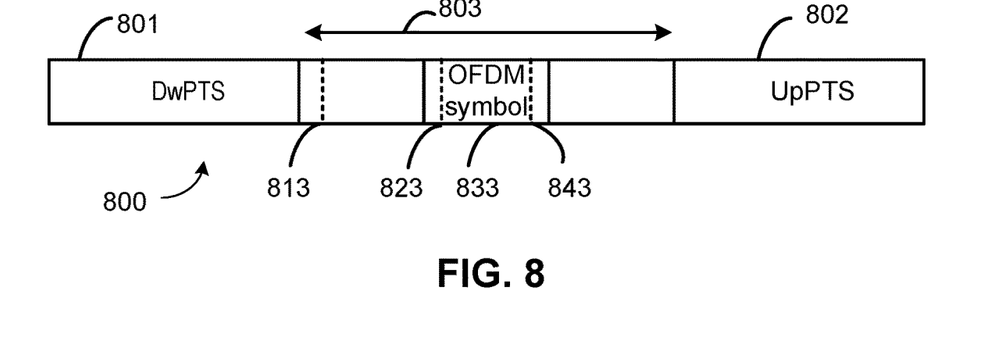
FIG. 8 illustrates a frame structure for transmitting a calibration signal according to an embodiment of the present disclosure.

Note that the calibration signal may be transmitted in a normal subframe or an empty time slice. FIG. 8 shows an example for transmitting the calibration signal in a GP of a special subframe 800 of a LTE TDD system. As shown in FIG. 8, the special subframe 800 includes a Downlink Pilot Time Slot (DwPTS) 801 for DL transmission, a Uplink Pilot Time Slot (UpPTS) 802 for uplink transmission and a GP 803. In this example, the calibration signal consisting of a pre-CP 823, a calibration sequence 833 and a post-CP 843 is transmitted in an OFDM symbol in the GP 803, while an antenna calibration command (AC-Command) is transmitted at a time slice 813 in the GP 803. The calibration flag triggering the antenna calibration at block 720 of FIG. 7 may be included in the AC-Command.

Now referring back to FIG. 7. At block 740, the DU 501 causes transmitting the calibration signal from antennas A and B, and the calibration signals are received by the antenna C. At block 750, the DU 501 obtains a phase difference between the antennas A and B for some subcarriers based on the received signals at antennas A, B and C, for example by solving the equations (1)-(4). Furthermore, time delay difference and initial phase may be obtained based on the phase difference, for example by using LS linear fitting. The time delay or phase difference may be compensated by the DU 501 using any suitable method based on the obtained time delay or phase difference.

Figure 9:
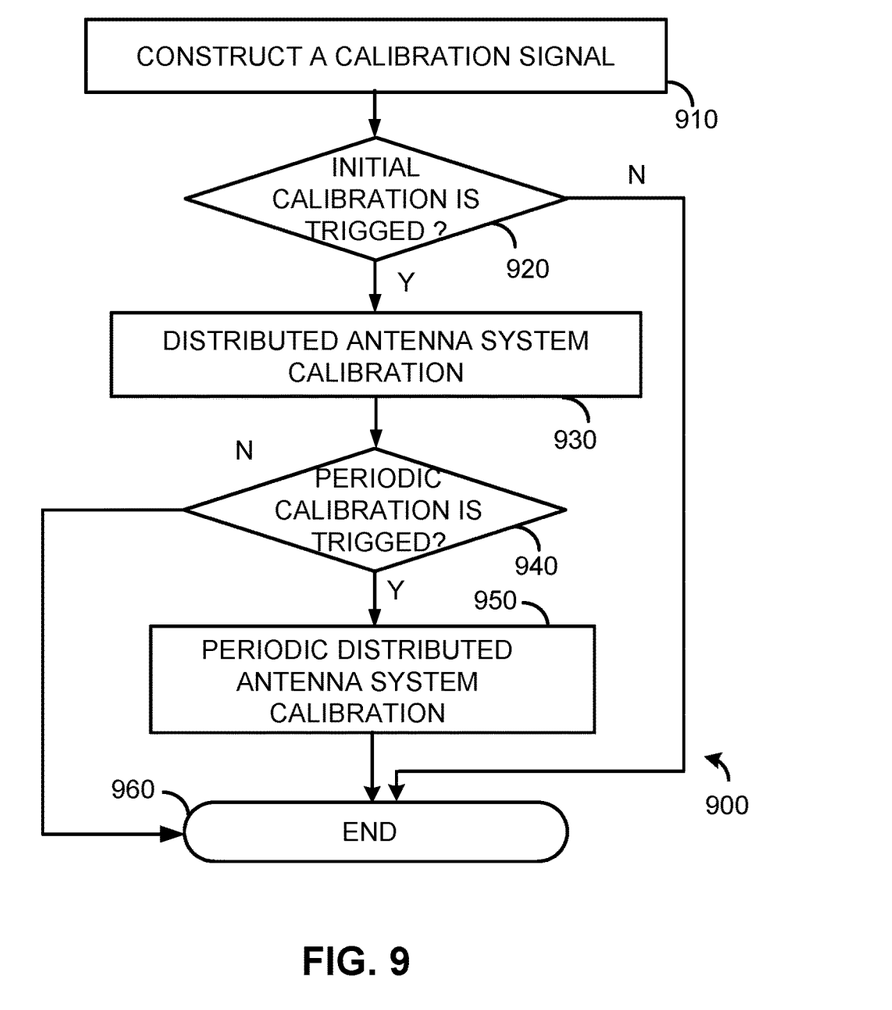
FIG. 9 illustrates a flow chart of still another antenna calibration method according to an embodiment of the present disclosure.

FIG. 9 shows a flowchart of still another method 900 in a DU according to an embodiment of the present disclosure. The DU is connected, directly or indirectly, with a plurality of distributed antennas. For instance, the DU may be the DU 501 shown in FIG. 5. For ease of discussion, the method 900 will be described below with reference to the DU 501 and the scenario illustrated in FIG. 5. However, embodiments of the present disclosure are not limited thereto and may be applied more widely in other scenarios where similar problem exists.

As illustrated in FIG. 9, at block 910, the DU 501 constructs a calibration signal, for example, the signal $s_c(n)$ described with reference to method 600. At block 920, the DU 501 determines whether initial antenna calibration is triggered. Distributed antenna system calibration is performed at block 930 if the initial antenna calibration is triggered; otherwise, the process ends at block 960. Note that at block 930, any embodiment of method 600 or 700 may be applied for achieving the antenna calibration. After the initial antenna calibration, at block 940, the DU 501 determines whether periodic antenna calibration is triggered. If so, periodic antenna calibration may be performed at block 950, for example by applying an implementation of method 600 or 700; otherwise, the process ends at block 960.

Compared with a conventional antenna calibration method, embodiments of the present invention enable distributed antennas calibration, for example for TDD systems based on D-MIMO technology. With embodiments of the present disclosure, antenna calibration may be implemented without introducing any absolute reference and without relying on the CCU. The calibration signal goes through wireless air-interface. Some embodiments may keep the reciprocity of uplink and downlink channel in TDD systems well, and thereby further enhance the joint pre-coding transmission performance of D-MIMO systems.

Figure 10:
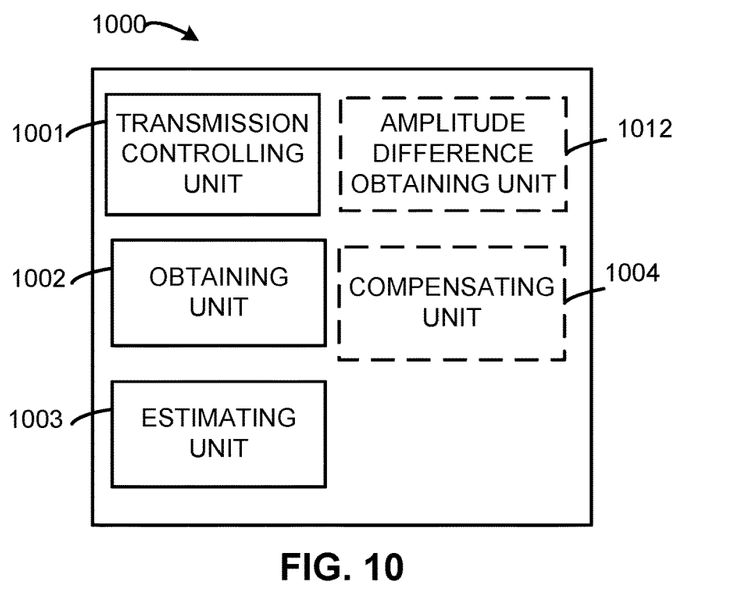
FIG. 10 illustrates a schematic block diagram of an apparatus implemented as/in a digital unit according to an embodiment of the present disclosure.

FIG. 10 illustrates a schematic block diagram of an apparatus 1000 in a wireless communication network, for example, the wireless communication network 100 shown in FIG. 1. The apparatus 1000 may be implemented as or in a DU 501 shown in FIG. 5. The DU 501 is connected, directly or indirectly, with a plurality of antennas including (but not limited to) a first antenna, a second antenna and a third antenna. The apparatus 1000 is operable to carry out any of the example methods 600, 700 and 900 described with reference to FIGS. 6-9 and possibly any other processes or methods. It is also to be understood that the methods 600, 700, 900 are not necessarily carried out by the apparatus 1000. Some operations of the methods 600, 700, 900 can be performed by one or more other entities.

As illustrated in FIG. 10, the apparatus 1000 includes a transmission controlling unit 1001, an obtaining unit 1002, and an estimating unit 1003. The transmission controlling unit 1001 is configured to cause transmitting a first signal from the first antenna, a second signal from the second antenna, and a third signal from the third antenna in a same frequency resource. The obtaining unit 1002 is configured to obtain a receiver and transmitter side loop-back phase difference between the first antenna and the second antenna based on the first signal received at the third antenna, the second signal received at the third antenna, the third signal received at the first antenna, and the third signal received at the second antenna. The estimating unit 1003 is configured to obtain estimations of a time delay difference and an initial phase difference between the first and second antennas based on the obtained loop-back phase difference.

Optionally, in some embodiments, the apparatus 1000 may further include a amplitude difference obtaining unit 1012, configured to obtain a loop-back amplitude difference between the first and second antennas based on the first signal received at the third antenna, the second signal received at the third antenna, the third signal received at the first antenna and the third signal received at the second antenna.

Alternatively or in addition, in another embodiment, the apparatus 1000 may further include a compensating unit 1004, configured to adjust a phase or timing of a signal to be transmitted from the first or second antenna based on the estimation of the time delay difference or initial phase difference.

In some embodiments, the transmission controlling unit 1001, the obtaining unit 1002, the estimating unit 1003, the amplitude difference obtaining unit 1012 and the compensating unit 1004 may be configured to perform the operations of blocks 610-650 of FIG. 6A respectively, and therefore relevant descriptions provided with reference to method 600 and FIGS. 6A-6B also apply here and details will not be repeated.

Figure 11:
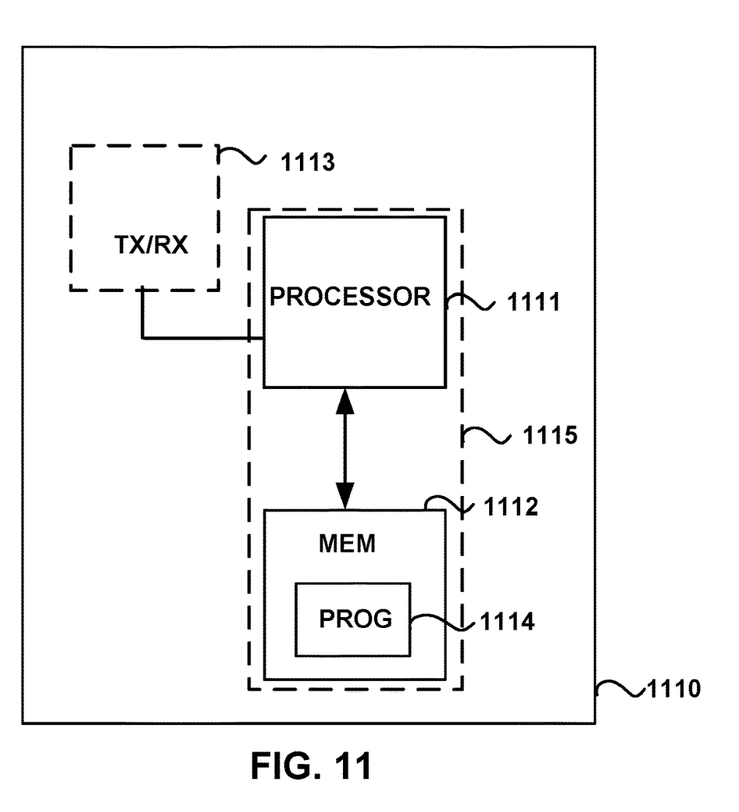
FIG. 11 illustrates a simplified block diagram of an apparatus that may be embodied as/in a digital unit.

FIG. 11 illustrates a simplified block diagram of an apparatus 1110 that may be embodied in or as a DU, for example, the DU 501 shown in FIG. 5.

The apparatus 1110 may include one or more processors 1111, such as a data processor (DP) and one or more memories (MEM) 1112 coupled to the processor 1111.

The apparatus 1110 may further include one or more transmitters (TX)/receivers (RX) 1113 coupled to the processor 1111. The MEM 1112 may be non-transitory machine readable storage medium and it may store a program or a computer program product (PROG) 1114. The PROG 1114 may include instructions that, when executed on the associated processor 1111, enable the apparatus 1110 to operate in accordance with the embodiments of the present disclosure, for example to perform the method 600, 700 or 900. A combination of the one or more processors 1111 and the one or more MEMs 1112 may form processing means 1115 adapted to implement various embodiments of the present disclosure.

Various embodiments of the present disclosure may be implemented by computer program or computer program product executable by the processor 1111, software, firmware, hardware or in a combination thereof.

The MEMs 1112 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processor 1111 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide computer readable storage medium such as a memory containing the computer program or computer program product as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program or computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a licensed wireless communication network in a digital unit connected with a plurality of distributed antennas including a first antenna, a second antenna and a third antenna, the method comprising:
   causing transmitting a first signal from the first antenna, a second signal from the second antenna, and a third signal from the third antenna in a same frequency without relying on a couple network or introducing any absolute reference;
   obtaining a receiver and transmitter side loop-back phase difference between the first antenna and the second antenna based on the first signal received at the third antenna, the second signal received at the third antenna, the third signal received at the first antenna, and the third signal received at the second antenna; and
   obtaining estimations of a time delay difference and an initial phase difference between the first and second antennas based on the obtained receiver and transmitter side loop-back phase difference.

2. The method of claim 1, wherein the causing transmitting comprises:
   causing transmitting the first signal, the second signal, and the third signal in a time period during which no data is transmitted in the licensed wireless communication network.

3. The method of claim 1, wherein the time period includes at least one of:
   a Guard Period in a time divisional duplexing, TDD, frame structure, and
   a subframe during which no data and control signaling is transmitted.

4. The method of claim 1, wherein the first signal, the second signal, and the third signal transmitted from the first antenna, the second antenna, and the third antenna are generated based on a same constant amplitude sequence.

5. The method of claim 1, wherein the causing transmitting comprises:
   causing transmitting the first signal, the second signal and the third signal in a time divisional multiplexing manner.

6. The method of claim 1, wherein obtaining the receiver and transmitter side loop-back phase difference between the first and second antennas comprises:
   obtaining a first loop-back phase for the first antenna by comparing a phase for the third signal received at the first antenna and a phase for the first signal received at the third antenna;
   obtaining a second loop-back phase for the second antenna by comparing a phase for the third signal received at the second antenna and a phase for the second signal received at the third antenna; and
   obtaining the receiver and transmitter side loop-back phase difference by determining a difference between the first and second loop-back phases.

7. The method of claim 1, wherein obtaining the estimations of the time delay difference and the initial phase difference between the first and second antennas comprise:
   estimating the time delay difference and the initial phase difference according to polynomial fit based on a Least Square criterion or a Recursive Least Square criterion.

8. The method of claim 1, wherein the obtaining the receiver and transmitter side loop-back phase difference between the first and second antennas comprises:
   obtaining the receiver and transmitter side loop-back phase difference between the first antenna and the second antenna for a subcarrier in the frequency resource.

9. The method of claim 1, further comprising:
   obtaining a loop-back amplitude difference between the first antenna and the second antenna based on the first signal received at the third antenna, the second signal received at the third antenna, the third signal received at the first antenna and the third signal received at the second antenna.

10. The method of claim 8, wherein obtaining the loop-back amplitude difference between the first antenna and the second antenna comprises:
obtaining the loop-back amplitude difference between the first and second antennas for a subcarrier in the frequency resource.

11. An apparatus in a licensed wireless communication network, the apparatus connected with a plurality of distributed antennas including a first antenna, a second antenna and a third antenna, the apparatus comprising a processor and a memory, said memory containing instructions executable by said processor whereby said apparatus is operative to:
cause transmitting a first signal from the first antenna, a second signal from the second antenna, and a third signal from the third antenna in a same frequency resource without relying on a couple network or introducing any absolute reference;
obtain a receiver and transmitter side loop-back phase difference between the first antenna and the second antenna based on the first signal received at the third antenna, the second signal received at the third antenna, the third signal received at the first antenna, and the third signal received at the second antenna; and
obtain estimations of a time delay difference and an initial phase difference between the first and second antennas based on the obtained receiver and transmitter side loop-back phase difference.

12. The apparatus of claim 11, wherein said memory contains instructions executable by said processor whereby said apparatus is further operative to cause transmitting the first signal, the second signal, and the third signal in a time period during which no data is transmitted.

13. The apparatus of claim 11, wherein the time period includes at least one of:
a Guard Period in a time divisional duplexing, TDD, frame structure, and
a subframe during which no data and control signaling is transmitted.

14. The apparatus of claim 11, wherein the first, second and third signals transmitted from the first, second, and third antennas are generated based on a same constant amplitude sequence.

15. The apparatus of claim 11, wherein said memory contains instructions executable by said processor whereby said apparatus is further operative to cause transmitting the first signal, the second signal, and the third signal in a time divisional multiplexing manner.

16. The apparatus of claim 11 wherein said memory contains instructions executable by said processor whereby said apparatus is further operative to obtain the receiver and transmitter side loop-back phase difference between the first antenna and the second antenna by:
obtaining a first loop-back phase for the first antenna by comparing a phase for the third signal received at the first antenna and a phase for the first signal received at the third antenna;
obtaining a second loop-back phase for the second antenna by comparing a phase for the third signal received at the second antenna and a phase for the second signal received at the third antenna; and
obtaining the receiver and transmitter side loop-back phase difference by determining a difference between the first and second loop-back phases.

17. The apparatus of claim 11, wherein said memory contains instructions executable by said processor whereby said apparatus is further operative to obtain the estimations of a time delay difference and an initial phase difference between the first antenna and the second antenna comprise:
estimating the time delay difference and the initial phase difference according to polynomial fit based on a Least Square criterion or a Recursive Least Square criterion.

18. The apparatus of claim 11, wherein said memory contains instructions executable by said processor whereby said apparatus is further operative to obtain the receiver and transmitter side loop-back phase difference between the first antenna and the second antenna by:
obtaining the receiver and transmitter side loop-back phase difference between the first and second antennas for a subcarrier in the frequency resource.

19. The apparatus of claim 11, herein said memory contains instructions executable by said processor whereby said apparatus is further operative to:
obtain a loop-back amplitude difference between the first antenna and the second antenna based on the first signal received at the third antenna, the second signal received at the third antenna, the third signal received at the first antenna and the third signal received at the second antenna.

20. The apparatus of claim 19, wherein said memory contains instructions executable by said processor whereby said apparatus is further operative to obtain the loop-back amplitude difference between the first antenna and the second antenna by:
obtaining the loop-back amplitude difference between the first antenna and the second antenna for a subcarrier in the frequency resource.

* * * * *

UNITED STATES PATENT AND TRADEMARK OFFICE
CERTIFICATE OF CORRECTION

PATENT NO. : 11,838,065 B2
APPLICATION NO. : 17/873238
DATED : December 5, 2023
INVENTOR(S) : Yu et al.

It is certified that error appears in the above-identified patent and that said Letters Patent is hereby corrected as shown below:

On the Title Page

On Page 2, in Item (56), under "OTHER PUBLICATIONS", in Column 2, Line 8, delete "recoprocity" and insert -- reciprocity --, therefor.

In the Drawings

In Fig. 9, Sheet 6 of 7, for Tag "920", Line 3, delete "TRIGGED ?" and insert -- TRIGGERED ? --, therefor.

In Fig. 9, Sheet 6 of 7, for Tag "940", Line 3, delete "TRIGGED ?" and insert -- TRIGGERED ? --, therefor.

In the Specification

In Column 1, Line 9, delete "Nov. 19, 2019," and insert -- Nov. 19, 2019, now U.S. Pat. No. 11,438,079, --, therefor.

In Column 2, Line 51, delete "time divisional duplexing (TDD)" and insert -- time division duplexing (TDD) --, therefor.

In Column 2, Lines 55-56, delete "time divisional multiplexing (TDM)" and insert -- time division multiplexing (TDM) --, therefor.

In Column 4, Line 15, delete "according the" and insert -- according to the --, therefor.

In Column 4, Line 21, delete "according the" and insert -- according to the --, therefor.

In Column 5, Line 43, delete "liming" and insert -- limiting --, therefor.

Signed and Sealed this
Twenty-sixth Day of March, 2024

Katherine Kelly Vidal
*Director of the United States Patent and Trademark Office*

CERTIFICATE OF CORRECTION (continued)
U.S. Pat. No. 11,838,065 B2

In Column 6, Line 39, delete "(IOT)" and insert -- (IoT) --, therefor.

In Column 7, Line 31, delete "minimized" and insert -- minimized. --, therefor.

In Column 7, Line 45, delete "intermedate" and insert -- intermediate --, therefor.

In Column 8, Line 2, delete "transmitting points (TPs)" and insert -- transmission points (TPs) --, therefor.

In Column 9, Lines 63-64, delete "Global Position System (GPS)" and insert -- Global Positioning System (GPS) --, therefor.

In Column 10, Line 40, delete "$x_u(n) = e^{-j\frac{\pi um(n+1)}{N_\omega}},$" and insert -- $x_u(n) = e^{-j\frac{\pi um(n+1)}{N_{zc}}},$ --, therefor.

In Column 10, Lines 44-45, delete "Discrete Fourier Transformation (DFT)" and insert -- Discrete Fourier Transform (DFT) --, therefor.

In Column 10, Line 49, delete "$0_1, \ldots 0_{N_2},$" and insert -- $0_1, \ldots, 0_{N_2},$ --, therefor.

In Column 10, Line 55, delete "$N_{CP})$]" and insert -- $N_{CP})$], --, therefor.

In Column 10, Line 55, delete "$S_{OFDM}(n) = DFT\ (x_c(k)),$" and insert -- $S_{OFDM}(n) = DFT(x_c(k)),$ --, therefor.

In Column 10, Lines 62-63, delete "Time Division-Synchronization Code Division Multiple Access (TD-SCDMA)" and insert -- Time Division-Synchronous Code Division Multiple Access (TD-SCDMA) --, therefor.

In Column 12, Line 12, delete "$-\theta_{2,k}$" and insert -- $=\theta_{2,k}$ --, therefor.

In Column 12, Line 35, delete "At" and insert -- $\Delta_t$ --, therefor.

In Column 12, Line 36, delete "$\phi_{ini},$" and insert -- $\varphi_{ini},$ --, therefor.

CERTIFICATE OF CORRECTION (continued)

In Column 12, Line 44, delete "$\phi_{ini}$" and insert -- $\varphi_{ini}$ --, therefor.

In Column 12, Line 47, delete "$\phi_{ini}$" and insert -- $\varphi_{ini}$ --, therefor.

In Column 12, Line 48, delete "$\phi_{ini}$" and insert -- $\varphi_{ini}$ --, therefor.

In Column 12, Line 51, delete "$\phi_{ini\_est}$" and insert -- $\varphi_{ini\_est}$ --, therefor.

In Column 12, Line 64, delete "$\phi_{ini\_est}$" and insert -- $\varphi_{ini\_est}$ --, therefor.

In Column 12, Line 64, delete "$\phi_{ini}$," and insert -- $\varphi_{ini}$, --, therefor.

In Column 13, Line 33, delete "$\phi_{ini}$" and insert -- $\varphi_{ini}$ --, therefor.

In Column 16, Line 3, delete "FIG. 5" and insert -- FIG. 5. --, therefor.

In the Claims

In Column 18, Line 23, in Claim 3, delete "time divisional duplexing, TDD," and insert -- time division duplexing, TDD, --, therefor.

In Column 19, Line 38, in Claim 13, delete "time divisional duplexing, TDD," and insert -- time division duplexing, TDD, --, therefor.

In Column 20, Line 33, in Claim 19, delete "herein" and insert -- wherein --, therefor.